(12) United States Patent
Sharma et al.

(10) Patent No.: US 10,460,257 B2
(45) Date of Patent: Oct. 29, 2019

(54) METHOD AND SYSTEM FOR TRAINING A TARGET DOMAIN CLASSIFIER TO LABEL TEXT SEGMENTS

(71) Applicant: Conduent Business Services, LLC, Dallas, TX (US)

(72) Inventors: Raksha Sharma, Gwalior (IN); Sandipan Dandapat, Kolkata (IN); Himanshu Sharad Bhatt, Nagar (IN)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 487 days.

(21) Appl. No.: 15/259,541

(22) Filed: Sep. 8, 2016

(65) Prior Publication Data

US 2018/0068231 A1 Mar. 8, 2018

(51) Int. Cl.
*G06N 20/00* (2019.01)
*G06F 16/35* (2019.01)

(52) U.S. Cl.
CPC ............. *G06N 20/00* (2019.01); *G06F 16/35* (2019.01)

(58) Field of Classification Search
CPC ................................ G06N 20/00; G06F 16/35
USPC ...................................................... 706/12–45
See application file for complete search history.

(56) References Cited

U.S. PATENT DOCUMENTS

| | | | |
|---|---|---|---|
| 9,600,231 B1 * | 3/2017 | Sun | G06F 3/167 |
| 2011/0119209 A1 * | 5/2011 | Kirshenbaum | G06N 5/02 |
| | | | 706/12 |
| 2016/0078022 A1 * | 3/2016 | Lisuk | G06F 3/04842 |
| | | | 706/12 |
| 2017/0039486 A1 * | 2/2017 | Simard | G06F 17/2785 |
| 2017/0060993 A1 * | 3/2017 | Pendar | G06F 17/30675 |
| 2017/0091313 A1 * | 3/2017 | Chalabi | G06F 17/30675 |
| 2018/0032901 A1 * | 2/2018 | Chowdhury | G06N 99/005 |

OTHER PUBLICATIONS

T. Li, Y. Zhang, and V. Sindhwani. A non-negative matrix tri-factorization approach to sentiment classification with lexical prior knowledge. In Proceedings of the Joint Conference of the 47th Annual Meeting of the ACL and the 4th International Joint Conference on Natural Language Processing of the AFNLP: vol. 1-vol. 1, pp. 244-252. Association for Computational Linguistics, 2009.

(Continued)

*Primary Examiner* — Shahriar Behnamian
(74) *Attorney, Agent, or Firm* — Jones Robb, PLLC

(57) ABSTRACT

The disclosed embodiments illustrate methods of data processing for training a target domain classifier to label text segments. The method includes identifying a set of common keywords with same label from a set of source keywords and a set of target keywords. The method includes training a first classifier, based on the set of common keywords, to label a first set of target text segments. The method includes training a second classifier based on at least a subset of the labeled first set of target text segments. The method includes training a third classifier, based on the first classifier and the second classifier, to label a second set of target text segments, wherein a subset of the labeled second set of target text segments is utilized for re-training the second classifier. The method further includes determining labels of another plurality of target text segments based on the re-trained second classifier.

20 Claims, 6 Drawing Sheets

(56) References Cited

OTHER PUBLICATIONS

B. Pang and L. Lee. A sentimental education: Sentiment analysis using subjectivity summarization based on minimum cuts. In Proceedings of the 42nd annual meeting on Association for Computational Linguistics, p. 271. Association for Computational Linguistics, 2004.

A. Cheng and O. Zhulyn. A system for multilingual sentiment learning on large data sets. In COLING, pp. 577-592, 2012.

J. Blitzer, M. Dredze, F. Pereira, et al. Biographies, bollywood, boom-boxes and blenders: Domain adaptation for sentiment classification. In ACL, vol. 7, pp. 440-447, 2007.

S. J. Pan, X. Ni, J.-T. Sun, Q. Yang, and Z. Chen. Cross-domain sentiment classification via spectral feature alignment. In Proceedings of the 19th international conference on World wide web, pp. 751-760. ACM, 2010.

R. Sharma and P. Bhattacharyya. Detecting domain dedicated polar words. In Proceedings of the International Joint Conference on Natural Language Processing, pp. 661-666. Citeseer, 2013.

A. Esuli and F. Sebastiani. Determining the semantic orientation of terms through gloss classification. In Proceedings of the 14th ACM international conference on Information and knowledge management, pp. 617-624. ACM, 2005.

T. Mikolov, K. Chen, G. Corrado, and J. Dean. Efficient estimation of word representations in vector space. arXiv preprint arXiv:1301.3781, 2013.

Z. Zheng, X. Wu, and R. Srihari. Feature selection for text categorization on imbalanced data. ACM Sigkdd Explorations Newsletter, 6(1):80-89, 2004.

E. Breck, Y. Choi, and C. Cardie. Identifying expressions of opinion in context. In IJCAI, vol. 7, pp. 2683-2688, 2007.

B. Pang, L. Lee, and S. Vaithyanathan. Thumbs up?: sentiment classification using machine learning techniques. In Proceedings of the ACL-02 conference on Empirical methods in natural language processing—vol. 10, pp. 79-86. Association for Computational Linguistics, 2002.

M. Taboada, J. Brooke, M. Tofiloski, K. Voll, and M. Stede. Lexicon-based methods for sentiment analysis. Computational linguistics, 37(2):267-307, 2011.

E. Cambria, B. Schuller, Y. Xia, and C. Havasi. New avenues in opinion mining and sentiment analysis. IEEE Intelligent Systems, (2):15-21, 2013.

B. Pang and L. Lee. Opinion mining and sentiment analysis. Foundations and trends in information retrieval, 2(1-2):1-135, 2008.

S. Rosenthal, P. Nakov, A. Ritter, and V. Stoyanov. Semeval-2014 task 9: Sentiment analysis in twitter. Proc. SemEval, pp. 73-80, 2014.

R. Prabowo and M. Thelwall. Sentiment analysis: A combined approach. Journal of Informetrics, 3(2):143-157, 2009.

* cited by examiner

METHOD AND SYSTEM FOR TRAINING A TARGET DOMAIN CLASSIFIER TO LABEL TEXT SEGMENTS

TECHNICAL FIELD

The presently disclosed embodiments are related, in general, to data processing. More particularly, the presently disclosed embodiments are related to a method and system for training a target domain classifier to label text segments.

BACKGROUND

Mostly, machine learning (ML) based automation systems are supervised systems, and primarily rely on labeled examples coded by analysts for learning specific tasks, such as labeling. The idea of using ML-based automation systems has led to significant contributions to domain adaptation and transfer learning (DA/TL) techniques. The DA/TL techniques leverage knowledge, such as labeled data, from one or multiple source domains to learn an accurate model for unlabeled data in a target domain.

Advancements in DA/TL techniques are also used in same-domain and cross-domain text classification. Typically, systems that deploy DA/TL techniques for cross-domain text classification work on the assumption that the source data (i.e., the labeled data) and target data (i.e., the unlabeled data) follow the same distribution. However, in practice, this assumption does not hold true due to inconsistency between the sentiments/polarity expressed by the source data and those by the target data. Thus, an advanced technique may be desired that efficiently performs cross-domain classification irrespective of the dissimilarity in data distributions and inconsistency between sentiments/polarity.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method of data processing for training a target domain classifier to label text segments. The method includes identifying, by one or more processors in a computing device, a set of common keywords with same label from a set of source keywords and a set of target keywords, wherein each keyword in the set of source keywords and the set of target keywords is associated with a label. The method further includes training, by the one or more processors in the computing device, a first classifier, based on the set of common keywords, to label a first set of target text segments from a plurality of target text segments, wherein each of the labeled first set of target text segments is associated with a first confidence score. The method further includes training, by the one or more processors in the computing device, a second classifier based on at least a subset of the labeled first set of target text segments for which the first confidence score exceeds a confidence threshold value. The method further includes training, by the one or more processors in the computing device, a third classifier, based on the trained first classifier and the trained second classifier, to label a second set of target text segments from the plurality of target text segments. Further, each of the labeled second set of target text segments is associated with a second confidence score. Further, a subset of the labeled second set of target text segments, for which the second confidence score exceeds the confidence threshold value, is utilized for re-training the second classifier. The method further includes determining, by the one or more processors in the computing device, labels of another plurality of target text segments based on the re-trained second classifier that corresponds to the target domain classifier.

According to embodiments illustrated herein, there is provided a system for data processing for training a target domain classifier to label text segments. The system includes one or more processors configured to identify a set of common keywords with same label from a set of source keywords and a set of target keywords, wherein each keyword in the set of source keywords and the set of target keywords is associated with a label. The one or more processors are further configured to train a first classifier, based on the set of common keywords, to label a first set of target text segments from a plurality of target text segments, wherein each of the labeled first set of target text segments is associated with a first confidence score. The one or more processors are further configured to train a second classifier based on at least a subset of the labeled first set of target text segments for which the first confidence score exceeds a confidence threshold value. The one or more processors are further configured to train a third classifier, based on the trained first classifier and the trained second classifier, to label a second set of target text segments from the plurality of target text segments. Further, each of the labeled second set of target text segments is associated with a second confidence score. Further, a subset of the labeled second set of target text segments, for which the second confidence score exceeds the confidence threshold value, is utilized for re-training the second classifier. The one or more processors are further configured to determine labels of another plurality of target text segments based on the re-trained second classifier that corresponds to the target domain classifier.

According to embodiments illustrated herein, there is provided a computer program product for use with a computing device. The computer program product comprises a non-transitory computer readable medium storing a computer program code for data processing for training a target domain classifier to label text segments. The computer program code is executable by one or more processors to identify a set of common keywords with same label from a set of source keywords and a set of target keywords, wherein each keyword in the set of source keywords and the set of target keywords is associated with a label. The computer program code is further executable by the one or more processors to train a first classifier, based on the set of common keywords, to label a first set of target text segments from a plurality of target text segments, wherein each of the labeled first set of target text segments is associated with a first confidence score. The computer program code is further executable by the one or more processors to train a second classifier based on at least a subset of the labeled first set of target text segments for which the first confidence score exceeds a confidence threshold value. The computer program code is further executable by the one or more processors to train a third classifier, based on the trained first classifier and the trained second classifier, to label a second set of target text segments from the plurality of target text segments. Further, each of the labeled second set of target text segments is associated with a second confidence score. Further, a subset of the labeled second set of target text segments, for which the second confidence score exceeds the confidence threshold value, is utilized for re-training the second classifier. The computer program code is further executable by the one or more processors to determine labels of another plurality of target text segments based on the re-trained second classifier that corresponds to the target domain classifier.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
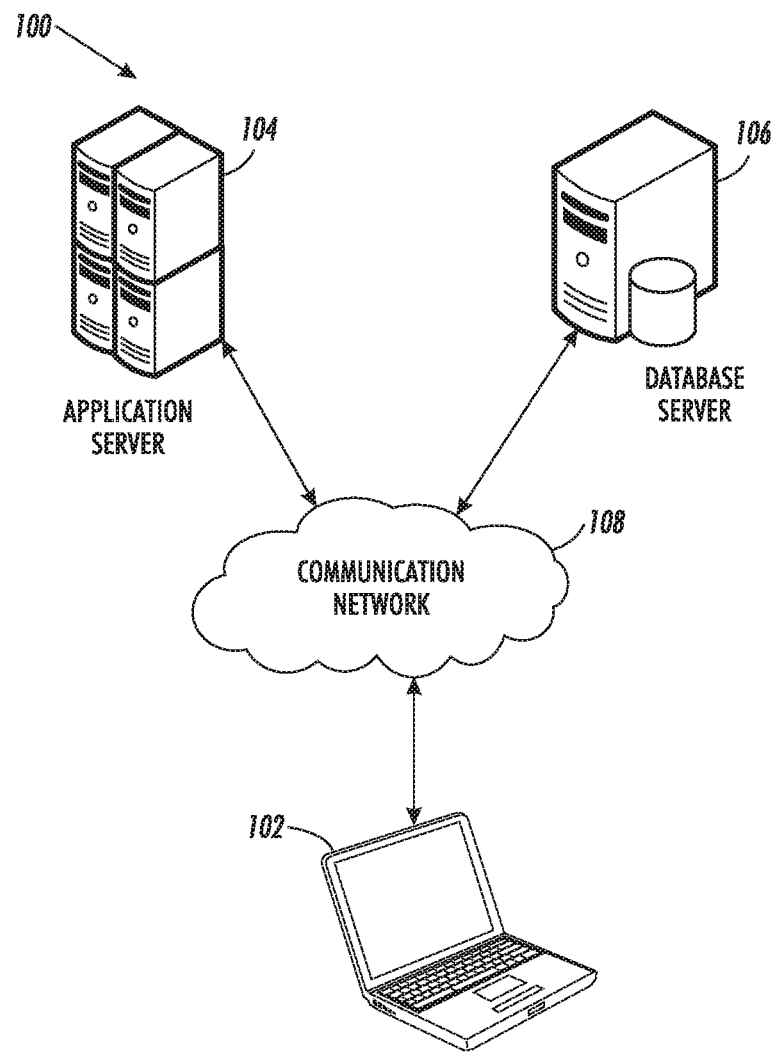
FIG. 1 is a block diagram that illustrates a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below:

A "user-computing device" refers to a computer, a device (that includes one or more processors/microcontrollers and/or any other electronic components), or a system (that performs one or more operations according to one or more programming instructions/codes) associated with a user. Examples of the user-computing device may include, but are not limited to, a desktop computer, a laptop, a personal digital assistant (PDA), a mobile device, a smartphone, and a tablet computer (e.g., iPad® and Samsung Galaxy Tab®).

A "source domain" corresponds to a technical or business field for which a classifier is already trained. In an embodiment, labeled data (i.e., a plurality of source text segments) from the source domain is utilized to train the classifier to label/classify a plurality of target text segments associated with a target domain.

A "target domain" refers to a technical or business field for which a classifier is to be trained. In an embodiment, labeled data (i.e., a plurality of source text segments) from one or more source domains is utilized to train the classifier to label/classify a plurality of target text segments associated with the target domain.

A "plurality of source text segments" corresponds to text content associated with a source domain. Examples of the plurality of source text segments may include a comment, a review, a message, a post, a share, a tweet, and/or the like by one or more users on a social networking site. In an embodiment, the plurality of source text segments may be labeled, such that each source text segment is associated with a label in a set of labels. The plurality of source text segments may be utilized to train a target domain classifier.

A "plurality of target text segments" corresponds to text content associated with a target domain. Examples of the plurality of target text segments may include a comment, a review, a message, a post, a share, a tweet, and/or the like by one or more users on a social networking site. In an embodiment, the plurality of target text segments may be unlabeled. In an embodiment, the plurality of target text segments may be utilized to train a target domain classifier. In another embodiment, a trained target domain classifier may be utilized to label each of the plurality of target text segments.

A "plurality of source keywords" corresponds to keywords present among a plurality of source text segments. For example, a plurality of source text segments, such as "It was an amazing movie" and "the movie had a different plot" comprises the plurality of source keywords, such as "It," "was," "an," "amazing," "movie," "the," "had," "a," "different," and "plot."

A "plurality of target keywords" corresponds to keywords present among a plurality of target text segments. For example, a plurality of target text segments, such as "It's a very inefficient product" and "the power back up of the product is unreliable," comprises the plurality of target keywords, such as "It's," "a," "very," "inefficient," "product," "the," "power," "back," "up," "of," "the," "is," and "unreliable."

A "set of common keywords" comprises keywords with same label that are present in both labeled set of source keywords and labeled set of target keywords. For example, in a labeled set of source keywords, such as {(unpredictable, positive), (predictable, negative), (entertaining, positive), (disappointing, negative), (different, positive), (terrific, positive), (awesome, positive)} and a labeled set of target keywords, such as {(unreliable, negative), (cheapest, positive), (predictable, positive), (different, negative), (awesome, positive), (disappointing, negative), (high-quality, positive)}, the set of common keywords may encompass keywords, such as {(disappointing, negative), (awesome, positive)}. In an embodiment, the set of common keywords may correspond to keywords that depict the same sentiment/polarity across a source domain and a target domain. In an embodiment, the set of common keywords correspond to significant consistent polarity (SCP) keywords.

A "label" corresponds to a tag/metadata associated with a text-segment/keyword. In an embodiment, the label associated with the text-segment/keyword may be indicative of an emotion/sentiment or polarity depicted by the text-segment/keyword. Examples of the label may include, but are not limited to, "positive" and "negative."

A "set of source keywords" encompasses keywords, present among a plurality of source keywords, for which a first significance score exceeds a first significance threshold value. In an embodiment, the set of source keywords may comprise keywords that are significant/important in the source domain.

A "set of target keywords" encompasses keywords, present among a plurality of target keywords, for which a second significance score is less than a second significance threshold value. In an embodiment, the set of target keywords may comprise keywords that are significant/important in the target domain.

"Training" refers to a process of updating/tuning a classifier using training data, such that the classifier, once trained, may be able to label target data, such as target text segments. In an embodiment, the classifier may be re-trained based on new training data to improve the accuracy of the classifier.

A "first set of target text segments" encompasses target text segments, from a plurality of target text segments, labeled by a trained first classifier. In an embodiment, a subset of first set of target text segments may be utilized in the initial training phase of a target domain classifier.

A "second set of target text segments" encompasses target text segments, from a plurality of target text segments, labeled by a trained third classifier. In an embodiment, a subset of second set of target text segments may be utilized to re-train a trained target domain classifier.

A "first confidence score" refers to a score that represents the measure of confidence with which a trained first classifier predicts a label for a target text segment in a first set of target text segments. In an embodiment, a high first confidence score of a label associated with a target text segment may indicate that the predicted label may be accurate for the target text segment.

A "first classifier" refers to a mathematical model that may be trained based on a set of common keywords, i.e., (the SCP keywords). In an embodiment, the first classifier may be utilized to label a first set of target text segments. In an embodiment, the first classifier may be utilized to train a third classifier and a target domain classifier. Examples of the first classifier may include, but are not limited to, a Support Vector Machine (SVM), a Logistic Regression, a Bayesian classifier, a Decision Tree classifier, a Copula-based classifier, a K-Nearest Neighbors (KNN) classifier, or a Random Field (RF) classifier. In an embodiment, the first classifier may associate a first confidence score with a target text segment when it labels the target text segment.

A "second classifier" refers to a mathematical model that may be trained based on a subset of a first set of labeled target text segments and/or a subset of a second set of labeled target text segments. In an embodiment, the second classifier may be trained iteratively based on the subset of a second set of labeled target text segments. The final re-trained second classifier may correspond to a trained target domain classifier. In an embodiment, the second classifier may be utilized to train a third classifier. Examples of the first classifier may include, but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Field (RF) Classifier. In an embodiment, the target domain classifier may be utilized to label a plurality of target text segments.

A "third classifier" refers to a mathematical model that may be trained based on a weighted combination of a trained first classifier and a trained second classifier. In an embodiment, the third classifier may be trained iteratively. In an embodiment, the trained third classifier may be utilized to train a target domain classifier. In an embodiment, the third classifier may be utilized to label a second set of target text segments. Examples of the first classifier may include, but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Field (RF) Classifier. In an embodiment, the third classifier may associate a second confidence score with a target text segment when it labels the target text segment.

A "second set of target text segments" encompasses target text segments, from a plurality of target text segments, labeled by a trained third classifier. In an embodiment, a subset of second set of target text segments may be utilized to re-train a second classifier.

A "second confidence score" refers to a score that represents the measure of confidence with which a trained third classifier predicts a label for a target text segment in a second set of target text segments. In an embodiment, a high second confidence score of a label associated with a target text segment may indicate that the predicted label may be accurate for the target text segment.

A "first significance score" refers to a score that indicates the measure of significance of a keyword for a source domain. In an embodiment, the first significance score may be determined by utilizing one or more statistical techniques, such as chi-square hypothesis technique. In an embodiment, the first scores of a plurality of source keywords may be utilized to determine a set of source keywords from the plurality of source keywords.

A "second significance score" refers to a score that indicates the measure of significance of a keyword for a target domain. In an embodiment, the second significance score may be determined by utilizing one or more correlation techniques. In an embodiment, the second scores of a plurality of target keywords may be utilized to determine a set of target keywords from the plurality of target keywords.

A "first score" refers to a score that may be indicative of the strength of association of a source keyword, in a set of source keywords, with a label in a set of labels. In an embodiment, the source keywords in the set of source keywords are labeled based on the corresponding first scores. The first score of a source keyword for a label may be determined by utilizing one or more statistical techniques, such as chi-square hypothesis technique.

A "second score" refers to a score that may be indicative of the strength of association of a target keyword, in a set of target keywords, with a label in a set of labels. In an embodiment, the target keywords in the set of target keywords are labeled based on the corresponding second scores. The second score of a target keyword in the set of target keywords may be determined based on one or more similarity measures between the target keyword and a set of pre-defined keywords.

FIG. 1 is a block diagram of a system environment in which various embodiments may be implemented. With reference to FIG. 1, there is shown a system environment 100 that includes one or more user-computing devices, such as a user-computing device 102, one or more application servers, such as an application server 104, one or more database servers, such as a database server 106, and a communication network 108. Various devices in the system environment 100 may be interconnected over the communication network 108. FIG. 1 shows, for simplicity, one user-computing device, such as the user-computing device 102, one application server, such as the application server 104, and one database server, such as the database server 106. However, it will be apparent to a person having ordinary skill in the art that the disclosed embodiments may also be implemented using multiple user-computing devices, multiple application servers, and multiple database servers, without departing from the scope of the disclosure.

The user-computing device 102 may refer to a computing device (associated with a user) that may be communicatively coupled to the communication network 108. The user-computing device 102 may include one or more processors and one or more memory units. The one or more memory units may include a computer readable code that may be executable by the one or more processors to perform one or more operations specified by the user. In an embodiment, the user may utilize the user-computing device 102 to transmit a request to the application server 104 for training a classifier for a target domain. In an embodiment, the user may transmit a plurality of source text segments associated with a source domain along with the request. In an embodiment, each of the plurality of source text segments may be associated with a label from a set of labels. In an embodiment, the user may further transmit a plurality of target text segments associated with the target domain. Further, each of the plurality of target text segments is independent of the label. The plurality of source text segments and the plurality of target text segments may correspond to training data for training the classifier for the target domain (i.e., the target domain classifier).

The user-computing device 102 may correspond to a variety of computing devices, such as, but not limited to, a laptop, a PDA, a tablet computer, a smartphone, and a phablet.

A person having ordinary skill in the art will understand that the scope of the disclosure is not limited to the utilization of the user-computing device 102 by a single user. In an embodiment, the user-computing device 102 may be utilized by more than one user to transmit the user-request.

The application server 104 may refer to a computing device or a software framework hosting an application or a software service that may be communicatively coupled to the communication network 108. In an embodiment, the application server 104 may be implemented to execute procedures, such as, but not limited to, programs, routines, or scripts stored in one or more memory units for supporting the hosted application or the software service. In an embodiment, the hosted application or the software service may be configured to perform one or more predetermined operations for training the target domain classifier. In an embodiment, the application server 104 may be configured to receive the request for training the target domain classifier from the user-computing device 102. Further, the application server 104 may receive the plurality of source text segments and the plurality of target text segments from the user-computing device 102. In another embodiment, when the request does not comprise the plurality of source text segments and the plurality of target text segments, the application server 104 may be configured to query the database server 106 to retrieve the plurality of source text segments and the plurality of target text segments. In yet another embodiment, the application server 104 may extract the plurality of target text segments from one or more social media websites. In an embodiment, the plurality of source text segments may comprise a plurality of source keywords and the plurality of target text segments may comprise a plurality of target keywords.

Thereafter, the application server 104 may be configured to identify the plurality of source keywords from the plurality of source text segments and the plurality of target keywords from the plurality of target text segments. The application server 104 may utilize one or more text processing techniques, such as optical character recognition technique, to identify the plurality of source keywords and the plurality of target keywords.

After the identification, the application server 104 may be configured to determine a first significance score for each of the plurality of source keywords. Thereafter, the application server 104 may be configured to identify a set of source keywords from the plurality of source keywords for which the first significance scores exceed a first significance threshold value. In an embodiment, the first significance threshold value may correspond to a pre-specified value. The application server 104 may further determine a second significance score for each of the plurality of target keywords. Thereafter, the application server 104 may be configured to identify a set of target keywords from the plurality of target keywords for which the second significance scores is less than a second significance threshold value. In an embodiment, the second significance threshold value may correspond to another pre-specified value.

In an embodiment, the application server 104 may be further configured to label each keyword in the set of source keywords and each keyword in the set of target keywords. Before labeling each keyword in the set of source keywords, the application server 104 may be configured to determine a first score for each keyword in the set of source keywords. The application server 104 may utilize one or more statistical techniques, such as chi-square hypothesis technique, to determine the first score for each keyword in the set of source keywords. Thereafter, the application server 104 may label each keyword in the set of source keywords based on the corresponding first score. In an embodiment, the application server 104 may assign a label to each keyword in the set of source keywords from the set of labels. In an embodiment, the application server 104 may be configured to determine a second score for each keyword in the set of target keywords. The application server 104 may utilize one or more similarity measures, such as cosine similarity vector, to determine the second score for each keyword in the set of target keywords. In an embodiment, the application server 104 may utilize the one or more similarity measures between a target keyword in the set of target keywords and a set of pre-defined keywords for determining the second score for the target keyword. In an embodiment, each pre-defined keyword may be associated with a label from the set of labels. Thereafter, the application server 104 may be configured to identify a set of common keywords with the same label from the labeled set of source keywords and the labeled set of target keywords.

In an embodiment, the application server 104 may further utilize the identified set of common keywords to train a first classifier. In an embodiment, the first classifier is associated with the source domain. The application server 104 may further utilize the trained first classifier to label a first set of target text segments from the plurality of target text segments. During labeling, the first classifier may associate a first confidence score with each of the first set of target text segments. Thereafter, the application server 104 may identify a subset of the labeled first set of target text segments for which the first confidence scores exceed a confidence threshold value. Further, the application server 104 may be configured to train a second classifier based on the subset of the labeled first set of target text segments.

Thereafter, in an embodiment, the application server 104 may be configured to train a third classifier based on the trained first classifier and the trained second classifier. In an embodiment, the third classifier may be a weighted combination of the trained first classifier and the trained second classifier. The application server 104 may further utilize the trained third classifier to label a second set of target text segments from the plurality of target text segments. During labeling, the third classifier may associate a second confidence score with each of the second set of target text segments. Thereafter, the application server 104 may be configured to identify a subset of the labeled second set of target text segments for which the second confidence scores exceed the confidence threshold value.

In an embodiment, the application server 104 may be further configured to re-train the second classifier based on the subset of the labeled second set of target text segments. In an embodiment, re-training the second classifier may be an iterative process that is based on a count of target text segments in the second set of target text segments. At each iteration, the application server 104 may be configured to compare the count of target text segments in the second set of target text segments in current iteration with the count of target text segments in the second set of target text segments in the previous iteration. The application server 104 may be configured to re-train the second classifier when the count of target text segments in the second set of target text segments during current iteration is less than the count of target text segments in the second set of target text segments during the previous iteration. In an embodiment, the final re-trained second classifier corresponds to the target domain classifier. In an embodiment, the application server 104 may utilize the target domain classifier to determine labels for another plurality of target text segments from the set of labels. In an embodiment, the application server 104 may be configured to store the target domain classifier in the database server 106, over the communication network 108.

The application server 104 may be realized through various types of application servers, such as, but not limited to, a Java application server, a .NET framework application server, a Base4 application server, a PHP framework application server, or any other application server framework. An embodiment of the structure of the application server 104 has been discussed later in FIG. 2.

A person having ordinary skill in the art will appreciate that the scope of the disclosure is not limited to realizing the application server 104 and the user-computing device 102, as separate entities. In an embodiment, the application server 104 may be realized as an application program installed on and/or running on the user-computing device 102, without deviating from the scope of the disclosure.

The database server 106 may refer to a computing device that may be communicatively coupled to the communication network 108. In an embodiment, the database server 106 may be configured to perform one or more database operations. The one or more database operations may include one or more of, but not limited to, receiving, storing, processing, and transmitting one or more queries, data, or content. The one or more queries, data, or content may be received/transmitted from/to various components of the system environment 100. In an embodiment, the database server 106 may be configured to store the plurality of source text segments and the plurality of target text segments. In an embodiment, the database server 106 may receive a query from the application server 104 to retrieve the plurality of source text segments and the plurality of target text segments for training the target domain classifier. In an embodiment, the database server 106 may be further configured to store the trained target domain classifier received from the application server 104. The application server 104 may further query the database server 106 to retrieve the trained target domain classifier for training the other plurality of target text segments. In an embodiment, the database server 106 may further store the set of pre-defined keywords. For querying the database server 106, one or more querying languages, such as, but not limited to, SQL, QUEL, and DMX, may be utilized. In an embodiment, the database server 106 may connect to the application server 104, using one or more protocols, such as, but not limited to, the ODBC protocol and the JDBC protocol. In an embodiment, the database server 106 may be realized through various technologies such as, but not limited to, Microsoft® SQL Server, Oracle®, IBM DB2®, Microsoft Access®, PostgreSQL®, MySQL®, and SQLite®.

A person having ordinary skill in the art will appreciate that the scope of the disclosure is not limited to realizing the database server 106 and the application server 104 as separate entities. In an embodiment, the functionalities of the database server 106 can be integrated into the application server 104, without departing from the scope of the disclosure.

The communication network 108 may correspond to a medium through which content and messages flow between various devices, such as the user-computing device 102, the application server 104, and the database server 106, of the system environment 100. Examples of the communication network 108 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the communication network 108 in accordance with various wired and wireless communication protocols such as Transmission Control Protocol and Internet Protocol (TCP/IP), User Datagram Protocol (UDP), and 2G, 3G, or 4G communication protocols.

Figure 2:
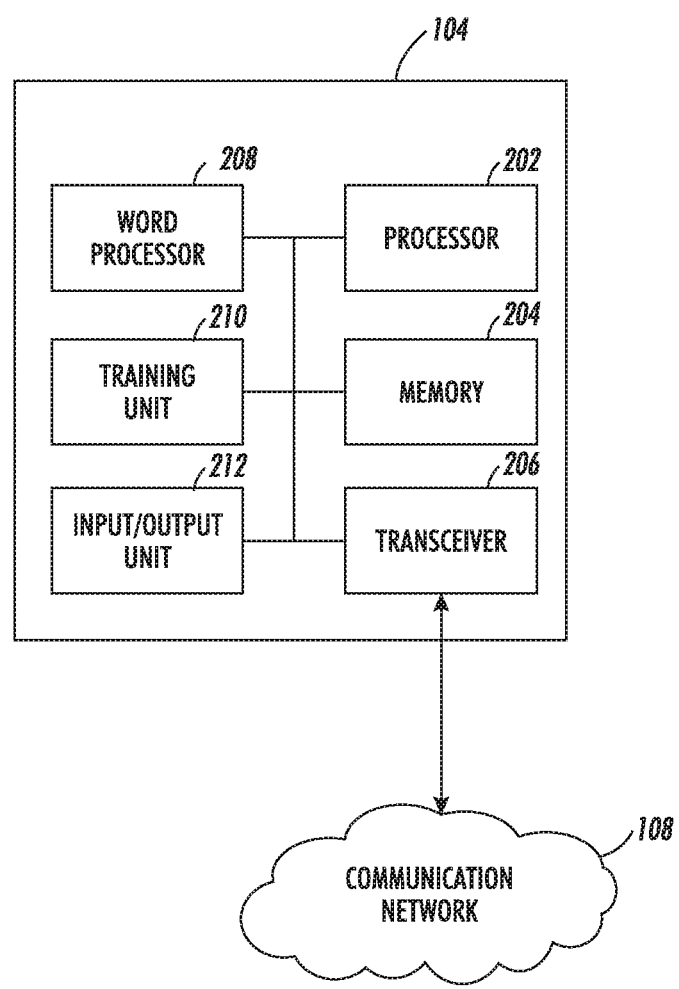
FIG. 2 is a block diagram that illustrates an application server, in accordance with at least one embodiment.

FIG. 2 is a block diagram that illustrates an application server, in accordance with at least one embodiment. FIG. 2 has been described in conjunction with FIG. 1. With reference to FIG. 2, there is shown a block diagram of the application server 104 that may include a processor 202, a memory 204, a transceiver 206, a word processor 208, a training unit 210, and an input/output unit 212. The processor 202 is communicatively coupled to the memory 204, the transceiver 206, the word processor 208, the training unit 210, and the input/output unit 212.

The processor 202 includes suitable logic, circuitry, and/or interfaces that are configured to execute one or more instructions stored in the memory 204. The processor 202 may further comprise an arithmetic logic unit (ALU) (not shown) and a control unit (not shown). The ALU may be coupled to the control unit. The ALU may be configured to perform one or more mathematical and logical operations and the control unit may control the operation of the ALU. The processor 202 may execute a set of instructions/programs/codes/scripts stored in the memory 204 to perform one or more operations for training the target domain classifier. In an embodiment, the processor 202 may be configured to determine the first significance score and the second significance score. In an embodiment, the processor 202 may be further configured to determine the first score and the second score. In an embodiment, the processor 202 may be further configured to label each keyword in the set of source keywords and the set of target keywords based on the first score and the second score, respectively. In an embodiment, the processor 202 may be further configured to identify the subset of the labeled first set of target text segments and the subset of the labeled second set of target text segments based on the first confidence score and the second confidence score, respectively. In an embodiment, the processor 202 may be configured to utilize the trained first classifier, the trained third classifier, and the re-trained second classifier (i.e., the target domain classifier) for labeling text segments (i.e., the first set of target text segments, the second set of target text segments, and the other plurality of target text segments).

The processor 202 may be implemented based on a number of processor technologies known in the art. Examples of the processor 202 may include, but are not limited to, an X86-based processor, a Reduced Instruction Set Computing (RISC) processor, and/or a Complex Instruction Set Computing (CISC) processor. In an alternate embodiment, the processor 202 may be implemented as an Application-Specific Integrated Circuit (ASIC) processor specially configured for training classifiers for various target domains.

The memory 204 may be operable to store one or more machine codes, and/or computer programs having at least one code section executable by the processor 202. The memory 204 may store the one or more sets of instructions that are executable by the processor 202, the transceiver 206, the word processor 208, the training unit 210, and the input/output unit 212. In an embodiment, the memory 204 may include one or more buffers (not shown). In an embodiment, the one or more buffers may be configured to store the first significance score, the second significance score, the first score, the second score, the first confidence score, and the second confidence score. In an embodiment, the one or more buffers may be configured to store intermediate information, such as the labeled set of source keywords, the labeled set of target keywords and etc., generated prior to/during the training of the target domain classifier. Examples of some of the commonly known memory implementations may include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations for training the target domain classifier. It will be apparent to a person having ordinary skill in the art that the one or more instructions stored in the memory 204 may enable the hardware of the application server 104 to perform the one or more predetermined operations, without deviating from the scope of the disclosure.

The transceiver 206 transmits/receives messages and data to/from various components, such as the user-computing device 102 and the database server 106 of the system environment 100, over the communication network 108. In an embodiment, the transceiver 206 may be communicatively coupled to the communication network 108. In an embodiment, the transceiver 206 may be configured to receive the request from the user-computing device 102 to train the target domain classifier. In an embodiment, the transceiver 206 may be further configured to transmit the trained target domain classifier to the database server 106 for storage. Examples of the transceiver 206 may include, but are not limited to, an antenna, an Ethernet port, a USB port, or any other port configured to receive and transmit data. The transceiver 206 transmits/receives the messages and data, in accordance with the various communication protocols, such as TCP/IP, UDP, and 2G, 3G, or 4G communication protocols.

The word processor 208 comprises suitable logic, circuitry, and/or interfaces that are configured to execute one or more instructions stored in the memory 204. In an embodiment, the word processor 208 may be configured to work in conjunction with the processor 202, to identify the plurality of source keywords and the plurality of target keywords from the plurality of source text segments and the plurality of target text segments, respectively. In an embodiment, the word processor 208 may be configured to identify the set of common keywords with the same labels from the labeled set of source keywords and the labeled set of source keywords. The word processor 208 may be implemented using one or more processor technologies known in the art. Examples of the word processor 208 may include, but are not limited to, an X86, a RISC processor, an ASIC processor, a CISC processor, or any other processor.

A person having ordinary skill in the art will appreciate that the scope of the disclosure is not limited to realizing the word processor 208 and the processor 202 as separate entities. In an embodiment, the functionalities of the word processor 208 may be implemented within the processor 202, without departing from the spirit of the disclosure. Further, a person skilled in the art will understand that the scope of the disclosure is not limited to realizing the word processor 208 as a hardware component. In an embodiment, the word processor 208 may be implemented as a software module included in computer program code (stored in the memory 204), which may be executable by the processor 202 to perform the functionalities of the word processor 208.

The training unit 210 comprises suitable logic, circuitry, and/or interfaces that are configured to execute one or more instructions stored in the memory 204. In an embodiment, the training unit 210 may be configured to train the first classifier, the second classifier, and the third classifier. In an embodiment, the training unit 210 may be configured to determine an optimal hyperplane for classifiers (i.e., the first classifier, the second classifier, and the third classifier) that is utilized by classifiers during labeling and determining the first confidence score and the second confidence score. The training unit 210 may be implemented using one or more processor technologies known in the art. Examples of the training unit 210 may include, but are not limited to, an X86, a RISC processor, an ASIC processor, a CISC processor, or any other processor.

A person having ordinary skill in the art will appreciate that the scope of the disclosure is not limited to realizing the training unit 210 and the processor 202 as separate entities. In an embodiment, the functionalities of the training unit 210 may be implemented within the processor 202, without departing from the spirit of the disclosure. Further, a person skilled in the art will understand that the scope of the disclosure is not limited to realizing the training unit 210 as hardware component. In an embodiment, the training unit 210 may be implemented as a software module included in computer program code (stored in the memory 204), which may be executable by the processor 202 to perform the functionalities of the training unit 210.

The input/output unit 212 may comprise suitable logic, circuitry, interfaces, and/or code that may be configured to provide an output to the user and/or the service provider. The input/output unit 212 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

The working of the application server 104 for training the target domain classifier to label target test segments has been explained later in FIGS. 3A and 3B.

Figure 3A:
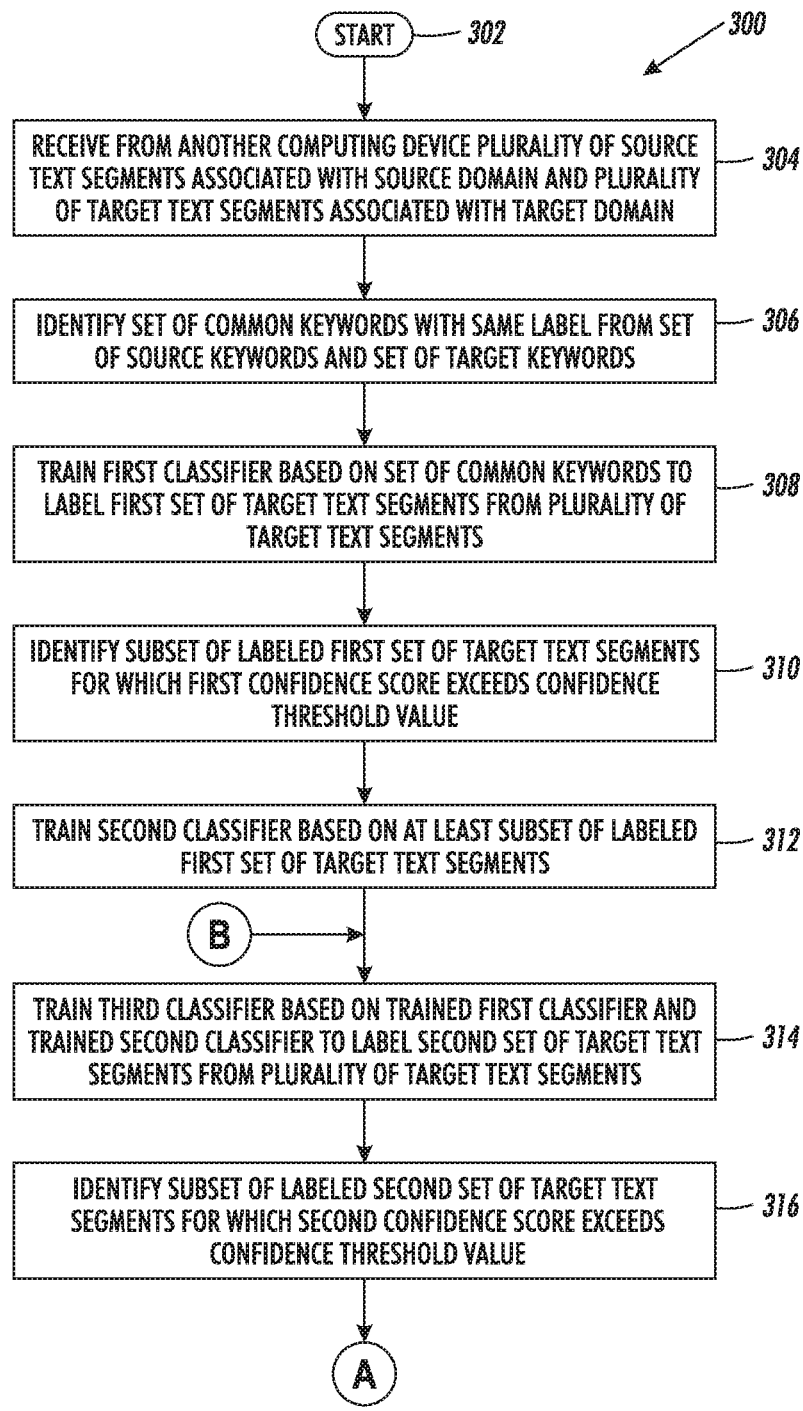
FIGS. 3A and 3B, collectively, depict a flowchart that illustrates a method for training a target domain classifier to label text segments, in accordance with at least one embodiment.
Figure 3B:
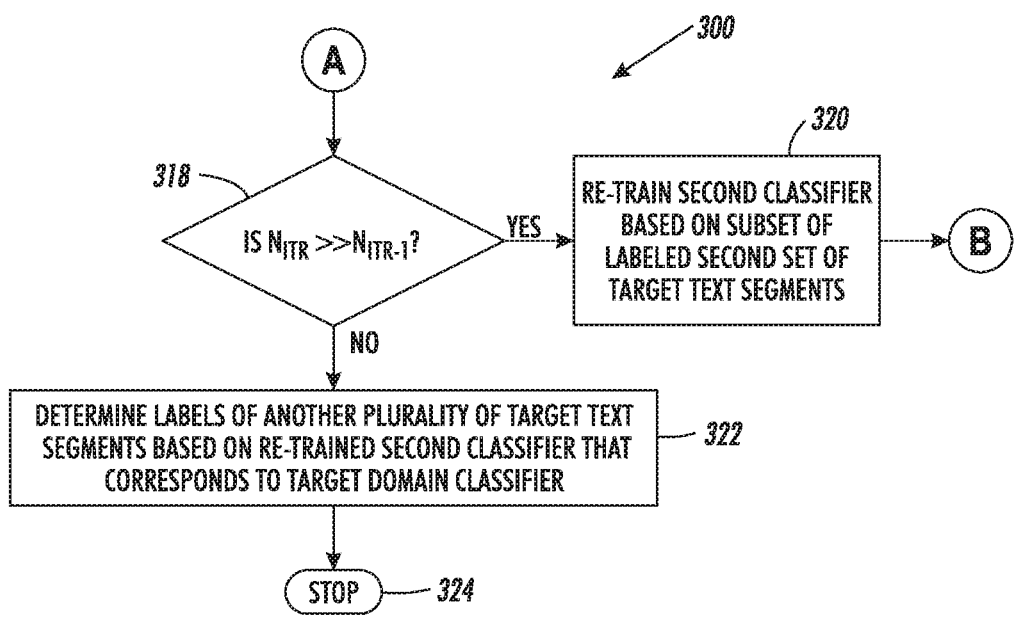

FIGS. 3A and 3B, collectively, depict a flowchart that illustrates a method of training a target domain classifier to label text segments, in accordance with at least one embodiment. FIGS. 3A and 3B are collectively described in conjunction with FIG. 1 and FIG. 2. With reference to FIGS. 3A and 3B, there is shown a flowchart 300 that illustrates a method of training the target domain classifier to label text segments. A person having ordinary skill in the art will understand that the examples, as described in FIGS. 3A and 3B, are for illustrative purpose and should not be construed to limit the scope of the disclosure. The method starts at step 302 and proceeds to step 304.

At step 302, the plurality of source text segments associated with the source domain, and the plurality of target text segments associated with the target domain, are received from the user-computing device 102. In an embodiment, the transceiver 206, in conjunction with the processor 202, may be configured to receive the plurality of source text segments and the plurality of target text segments. In an embodiment, the processor 202 may receive the request to train the target domain classifier from the user associated with the user-computing device 102. In an embodiment, the request may comprise the plurality of source text segments and the plurality of target text segments. In another embodiment, the request may comprise information pertaining to the source domain and the target domain. The processor 202 may be configured to utilize the information in the request to query the database server 106 for retrieving the plurality of source text segments associated with the specified source domain and the plurality of target text segments associated with the specified target domain. In another embodiment, the processor 202, in conjunction with the transceiver 206, may extract the plurality of target text segments associated with the specified target domain from the one or more social media websites. Each of the plurality of source text segments may be associated with a label, such as "positive" or "negative," of the set of labels. Further, each of the plurality of target text segments may be independent of labels. In an embodiment, the plurality of source text segments may comprise the plurality of source keywords. The plurality of target text segments may comprise the plurality of target keywords.

In an exemplary scenario, the processor 202 may receive the plurality of source text segments, such as reviews, posts, tweets, and/or the like, associated with the source domain "movie" and the plurality of target text segments, such as reviews, posts, tweets, and/or the like, associated with the target domain "electronics" based on the request. Each of the plurality of source text segments is associated with a label, such as "positive" or "negative," in the set of labels. The label "positive" associated with a source text segment "ST_1" represents that the source text segment "ST_1" conveys a positive sentiment about the source domain "movie." The label "negative" associated with another source text segment "ST_7" represents that the source text segment "ST_7" conveys a negative sentiment about the source domain "movie." The plurality of target text segments is unlabeled.

A person having ordinary skill in the art will understand the scope of the labels "positive" and "negative" illustrated in the abovementioned example are for illustrative purpose and should not be construed to limit the scope of the disclosure. In another embodiment, the plurality of source text segments may be associated with any other labels, such as "good," "bad," "neutral," and/or the like.

Thereafter, in an embodiment, the word processor 208 may be configured to identify the plurality of source keywords from the plurality of source text segments. The word processor 208 may be further configured to identify the plurality of target keywords from the plurality of target text segments. The word processor 208 may utilize one or more text processing techniques, such as optical character recognition technique, known in the art for identifying the plurality of source keywords and the plurality of target keywords. For example, Table 1, as shown below, represents the plurality of source keywords and the plurality of target keywords identified from the plurality of source text segments and the plurality of target text segments, respectively.

TABLE 1

| Plurality of source keywords and plurality of target keywords | |
|---|---|
| Plurality of source keywords (domain: movie) | Plurality of target keywords (domain: electronics) |
| thought-provoking, unpredictable, predictable, entertaining, great, terrific, different, awesome, disappointing | high-quality, unreliable, cheapest, different, predictable, awesome, disappointing |

A person having ordinary skill in the art will understand that the keywords in the abovementioned table are for illustrative purpose and should not be construed to limit the scope of the disclosure.

After identification, the processor 202 may be configured to determine the first significance score for each of the plurality of source keywords. The processor 202 may utilize one or more statistical techniques, such as chi-square hypothesis technique or term frequency-inverse document frequency technique, known in the art for to determine the first significance score. In an exemplary scenario, the processor 202 may utilize the chi-square hypothesis technique to determine the first significance score for each of the plurality of source keywords. The processor 202 may determine the first significance score based on equation (1), as shown below:

$$\text{Significance } score_{first}(w_s) = \frac{((c_p - \mu)^2 + (c_n - \mu)^2)}{\mu} \quad (1)$$

where, $c_p$ represents a count of times a source keyword $w_s$, in the plurality of source keywords, appears in source text segments of the plurality of source text segments associated with label "positive." For a source keyword, such as "unpredictable," which appears in "22" source text segments that are associated with label "positive," $c_p$=22;

$c_p$ represents a count of times the source keyword $w_s$, in the plurality of source keywords, appears in source text segments of the plurality of source text segments associated with label "negative." For a source keyword, such as "unpredictable," which appears in "10" source text segments that are associated with label "negative," $c_n$=10;

$\mu$ represents a null hypothesis value based on an assumption that the source keyword $w_s$ has equal association with source text segments of the plurality of source text segments with label "positive" and "negative," $\mu$=16; and Significance $score_{first}(w_s)$ represents the first significance score for the source keyword $w_s$ (i.e., "4.5").

The processor 202 may be further configured to determine the second significance score for each of the plurality of target keywords. The processor 202 may utilize one or more correlation techniques known in the art for determining the second significance score. In an exemplary scenario, the processor 202 may be configured to determine a correlation value of each target keyword, in the plurality of target keywords, with every other target keyword in the plurality of target keywords. The correlation values thus obtained for each pair of the plurality of target keywords may correspond to the second significance score.

In an embodiment, the processor 202 may utilize the first significance score to identify the set of source keywords from the plurality of source keywords. For identification, the processor 202 may compare the first significance score of each of the plurality of source keywords with the first significance threshold value. Based on the comparison, the processor 202 may identify the source keywords in the plurality of source keywords for which the first significance score exceeds the first significance threshold value. In an embodiment, the identified source keywords whose first significance score is higher than the first significance threshold value constitute the set of source keywords. For example, the processor 202 may compare the first significance score, such as "4.5," of a source keyword, such as "unpredictable," with the first significance threshold value, such as "3.84." As the first significance score "4.5" of the source keyword "unpredictable" exceeds the first significance threshold value "3.84," the processor 202 may identify the source keyword "unpredictable" to constitute the set of source keywords.

In an embodiment, the processor 202 may utilize the second significance score to identify the set of target keywords from the plurality of target keywords. For identification, the processor 202 may compare the second significance score of each of the plurality of target keywords with the second significance threshold value. Based on the comparison, the processor 202 may identify the target keywords in the plurality of target keywords for which the second significance score is less than the first significance threshold value. In an embodiment, the identified target keywords whose second significance score is less than the first significance threshold value may constitute the set of target keywords. For example, the processor 202 may compare the second significance score, such as "−1," of a first pair of target keywords, such as "disappointing" and "awesome," in the plurality of target keywords, such as "awesome," "disappointed" and "the," with the second significance threshold value, such as "0." The processor 202 may further compare the second significance score, such as "5," of a second pair of target keywords, such as "disappointing" and "the," with the second significance threshold value "0." The processor 202 may further compare the second significance score, such as "3," of a third pair of target keywords, such as "awesome" and "the," with the second significance threshold value "0." Based on the comparison, the processor 202 may identify the target keywords, such as "disappointing, and "awesome" to constitute the set of target keywords. The processor 202 may not identify the target keyword "the" to constitute the set of target keywords.

A person having ordinary skill in the art will understand that the abovementioned examples are for illustrative purpose and should not be construed to limit the scope of the disclosure.

In an embodiment, the processor 202 may be configured to label each keyword in the set of source keywords and each keyword in the set of target keywords. Before labeling, the processor 202 may be configured to determine the first score and the second score for each keyword in the set of source keywords and the set of target keywords, respectively.

In an embodiment, the processor 202 may utilize the one or more statistical techniques, such as the chi-square hypothesis technique, to determine the first score for each source keyword in the set of source keywords. The first score of a source keyword in the set of source keywords may be indicative of the strength of association of the source keyword with a label in the set of labels. Thus, the processor 202 may be configured to determine the first score of each source keyword in the set of source keywords for each label in the set of labels. Further, the label in the set of labels whose first score of the source keyword is highest is assigned to the source keyword. In an exemplary scenario, the processor 202 may utilize the chi-square hypothesis technique to determine the strength of association (i.e., the first score) of a source keyword, such as "unpredictable," with each label (i.e., "positive" and "negative") in the set of labels. The processor 202 may determine that the first score of the source keyword "unpredictable" (i.e., in the source domain "movie") is highest for the label "positive." Thus, the processor 202 assigns the label "positive" to the source keyword "unpredictable." Similarly, the processor 202 assigns labels from the set of labels to the remaining source keywords in the set of source keywords based on the corresponding first scores.

A person having ordinary skill in the art will understand that the abovementioned examples are for illustrative purpose and should not be construed to limit the scope of the disclosure.

In an embodiment, the processor 202 may utilize the one or more similarity measures, such as cosine similarity vector, to determine the second score for each target keyword in the set of target keywords. In an embodiment, the processor 202 may utilize the one or more similarity measures between a target keyword in the set of target keywords and the set of pre-defined keywords to determine the second score for the target keyword. Before determining the second score, the processor 202, in conjunction with the transceiver 206, may be configured to query the database server 106 for retrieving the set of pre-defined keywords, over the communication network 108. Thereafter, the processor 202 may be configured to determine a similarity value (i.e., the second score) for the target keyword with each pre-defined keyword in the set of pre-defined keywords. Further, the processor 202 may identify a pre-defined keyword that has highest similarity value corresponding to the target keyword. The processor 202 may then assign the label associated with the identified pre-defined keyword to the target keyword. In an exemplary scenario, the processor 202 may utilize the cosine similarity vector to determine the similarity values (i.e., the second score) for a target keyword, such as "disappointed" in the target domain "electronics," with each pre-defined keyword, such as "good," "excellent," "bad," "mesmerizing," "irritating," and "unfortunate," in the set of pre-defined words. The processor 202 may determine that the second score of the target keyword "disappointed" is highest for the pre-defined keyword "irritating." Thus, the processor 202 assigns the label "negative," associated with the identified pre-defined keyword "irritating," to the target keyword "disappointed." Similarly, the processor 202 assigns labels from the set of labels to the remaining target keywords in the set of target keywords based on the corresponding second scores.

A person having ordinary skill in the art will understand that the abovementioned example is for illustrative purpose and should not be construed to limit the scope of the disclosure. Further the scope of the disclosure is not limited to the use of the set of pre-defined keywords for determination of the second score. In an alternate embodiment, the processor 202 may determine the second score for each target keyword in the set of target keywords based on the labeled set of source keywords by utilizing a context similarity technique, such as cosine similarity vector.

At step 306, the set of common keywords with the same label is identified from the set of source keywords and the set of target keywords. In an embodiment, the word processor 208, in conjunction with the processor 202, may be configured to identify the set of common keywords with the same label from the set of source keywords and the set of target keywords. For example, the word processor 208 determines that a keyword, such as "disappointing," appears in both the labeled set of source keywords and the labeled set of target keywords. The word processor 208 further determines that the keyword "disappointing" is associated with the same label "negative" in both the labeled set of source keywords and the labeled set of target keywords. The word processor 208 further determines that another keyword, such as "different" appears in both the labeled set of source keywords and the labeled set of target keywords. The word processor 208 further determines that the keyword "different" is associated with the label "positive" when in the labeled set of source keywords and is associated with the label "negative" when in the labeled set of target keywords. Thus, based on the determination, the word processor 208 identifies the keyword "disappointing" to constitute the set of common keywords with same label and rejects the keyword "different."

A person having ordinary skill in the art will understand that the abovementioned example is for illustrative purpose and should not be construed to limit the scope of the disclosure.

At step 308, the first classifier is trained based on the set of common keywords to label the first set of target text segments from the plurality of target text segments. In an embodiment, the training unit 210, in conjunction with the processor 202, may be configured to train the first classifier based on the set of common keywords to label the first set of target text segments. Examples of the first classifier may include, but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Field (RF) Classifier. During training, the training unit 210 determines the first optimal hyperplane for the first classifier based on the set of common keywords (i.e., the training data).

After training, the processor 202 may utilize the trained first classifier for labeling the first set of target text segments from the plurality of target text segments. The trained first classifier may assign a label to each target text segment in the first set of target text segments based on the labels assigned to the set of common keywords. The trained first classifier may further utilize the first optimal hyperplane for labeling the first set of target text segments. While labeling a target text segment of the first set of target text segments, the trained first classifier may associate the first confidence score with the target text segment. In an embodiment, the trained first classifier may determine the first confidence score based on a distance of the target text segment from the first optimal hyperplane. The first confidence score determined by the trained first classifier may be indicative of the confidence value with which the trained first classifier predicts the label for the target text segment.

At step 310, the subset of labeled first set of target text segments, for which the first confidence score exceeds the confidence threshold value, is identified. In an embodiment, the processor 202 may be configured to identify the subset of labeled first set of target text segments for which the first confidence score exceeds the confidence threshold value. In an embodiment, the confidence threshold value may correspond to a pre-determined value. In an embodiment, the processor 202 may be configured to compare the first confidence score of each target text segment in the labeled first set of target text segments with the confidence threshold value. Based on the comparison, the processor 202 may identify the labeled target text segments in the labeled first set of target text segments whose first confidence score is higher than the confidence threshold value. The identified labeled target text segments constitute the subset of labeled first set of target text segments. For example, the labeled first set of target text segments, such as {TT_1, TT_2, TT_3, TT_4, TT_5, TT_6}, may have the respective first confidence scores, such as {0.4, 0.6, 0.2, 0.7, 0.6, 0.87}. The confidence threshold value may be pre-determined as "0.57." Based on the comparison of the first confidence scores {0.4, 0.6, 0.2, 0.7, 0.6, 0.87} with the confidence threshold value "0.57," the processor 202 may identify the subset of labeled first set of target text segments, such as {TT_2, TT_4, TT_5, TT_6}.

A person having ordinary skill in the art will understand that the abovementioned example is for illustrative purpose and should not be construed to limit the scope of the disclosure.

At step 312, the second classifier is trained based on at least the subset of the labeled first set of target text segments. In an embodiment, the training unit 210, in conjunction with the processor 202, may be configured to train the second classifier based on at least the subset of labeled first set of target text segments. Examples of the first classifier may include, but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Field (RF) Classifier. During training, the training unit 210 may be configured to determine the second optimal hyperplane for the second classifier based on the subset of labeled first set of target text segments (i.e., the training data).

Before training the second classifier, the word processor 208 may be configured to extract target keywords from target text segments in the subset of labeled first set of target text segments. The word processor 208 may utilize one or more text processing techniques known in the art to extract the target keywords from target text segments in the subset of labeled first set of target text segments. In an embodiment, the processor 202 may be further configured to assign a label to each of the extracted target keywords based on the label of the corresponding target text segment in the subset of labeled first set of target text segments. For example, the processor 202 may assign a label "negative" to a keyword, such as "unreliable," extracted from a target text segment, such as "it's such an unreliable product that I am really disappointed," (in the subset of labeled first set of target text segments) labeled "negative" by the trained first classifier.

A person having ordinary skill in the art will understand that the abovementioned example is for illustrative purpose and should not be construed to limit the scope of the disclosure.

Thereafter, the training unit 210 may be configured to train the second classifier based on the labeled extracted target keywords.

At step 314, the third classifier is trained based on the trained first classifier and the trained second classifier to label the second set of target text segments from the plurality of target text segments. In an embodiment, the training unit 210, in conjunction with the processor 202, may be configured to train the third classifier based on the trained first classifier and the trained second classifier to label the second set of target text segments from the plurality of target text segments. In an embodiment, the third classifier may correspond to a weighted combination of the trained first classifier and the trained second classifier. In an embodiment, the training unit 210 may be configured to determine a third optimal hyperplane for the third classifier based on the first optimal hyperplane of the trained first classifier and the second optimal hyperplane of the trained second classifier.

In an embodiment, the weights of the trained first classifier and the trained second classifier utilized to train the third classifier are determined based on an accuracy parameter associated with each of the trained first classifier and the trained second classifier. In an embodiment, the accuracy parameter may indicate the measure of accuracy with which the trained first classifier and the trained second classifier predict labels for text segments. The training unit 201 may utilize equation (2), as shown below, for training the third classifier:

$$Classifier_{third} = \frac{(Classifier_{first} * W_{first} + Classifier_{second} * W_{second})}{W_{first}} \quad (2)$$

where, $Classifier_{first}$ represents the trained first classifier;

$W_{first}$ first represents the weight of the trained first classifier determined based on the accuracy parameter of the trained first classifier;

$Classifier_{second}$ represents the trained second classifier; and $W_{second}$ represents the weight of the trained second classifier determined based on the accuracy parameter of the trained second classifier.

After training, the processor 202 may utilize the trained third classifier for labeling the second set of target text segments from the plurality of target texts segment. In an embodiment, the trained third classifier may assign a label, from the labels assigned to the set of common keywords, to each target text segment in the second set of target text segments. The trained third classifier may further utilize the third optimal hyperplane for labeling the second set of target text segments. While labeling a target text segment of the second set of target text segments, the trained third classifier may associate the second confidence score with the target text segment. In an embodiment, the trained third classifier may determine the second confidence score based on a distance of the target text segment from the third optimal hyperplane. The second confidence score determined by the trained third classifier may be indicative of the confidence value with which the trained third classifier predicts the label for the target text segment in the second set of the target text segments.

At step 316, the subset of the labeled second set of target text segments for which the second confidence score exceeds the confidence threshold value is identified. In an embodiment, the processor 202 may be configured to identify the subset of the labeled second set of target text segments for which the second confidence score exceeds the confidence threshold value. In an embodiment, the confidence threshold value may correspond to the pre-determined value. In an embodiment, the processor 202 may be configured to compare the second confidence score of each target text segment in the labeled second set of target text segments with the confidence threshold value. Based on the comparison, the processor 202 may identify the labeled target text segments in the labeled second set of target text segments whose second confidence score is higher than the confidence threshold value. The identified labeled target text segments constitute the subset of labeled second set of target text segments. For example, the labeled second set of target text segments, such as {TT_7, TT_8, TT_9, TT_10, TT_11, TT_12}, may have the respective second confidence scores, such as {0.3, 0.26, 0.67, 0.2, 0.89, 0.67}. The confidence threshold value may be pre-determined as "0.57." Based on the comparison of the second confidence scores {0.3, 0.26, 0.67, 0.2, 0.89, 0.67} with the confidence threshold value "0.57," the processor 202 may identify the subset of labeled first set of target text segments, such as {TT_9, TT_11, TT_12}.

A person having ordinary skill in the art will understand that the abovementioned example is for illustrative purpose and should not be construed to limit the scope of the disclosure.

At step 318, a check is performed to determine whether the count of target text segments in the second set of target text segments in current iteration exceeds the count of target text segments in the second set of target text segments in a previous iteration. In an embodiment, the processor 202 may be configured to determine whether the count of target text segments in the second set of target text segments in the current iteration exceeds the count of target text segments in the second set of target text segments in the previous iteration. If the processor 202 determines that the count of target text segments in the second set of target text segments in the current iteration exceeds the count of target text segments in the second set of target text segments in the previous iteration, control passes to step 320. Else, control passes to step 322.

At step 320, the second classifier is re-trained based on the subset of labeled second set of target text segments. In an embodiment, the training unit 210, in conjunction with the processor 202, may be configured to re-train the second classifier based on the subset of labeled second set of target text segments. During re-training, the training unit 210 may be configured to modify the second optimal hyperplane for the second classifier based on the subset of labeled second set of target text segments (i.e., the training data). The re-training of the second classifier is similar to that described in step 312. In an embodiment, the re-training of the second classifier may be an iterative process. Control passes to step 314.

At step 322, the labels of the other plurality of target text segments are determined based on the re-trained second classifier that corresponds to the target domain classifier. In an embodiment, the processor 202 may be configured to determine the labels of the other plurality of target text segments based on the re-trained second classifier that corresponds to the target domain classifier. In an embodiment, the processor 202, in conjunction with the transceiver 206, may be configured to transmit the target domain classifier to the user associated with the user-computing device 102. In an embodiment, the user may utilize the target domain classifier for labeling another plurality of target text segments. The processor 202 may further store the target domain classifier in the database server 106. Control passes to end step 324.

Figure 4A:
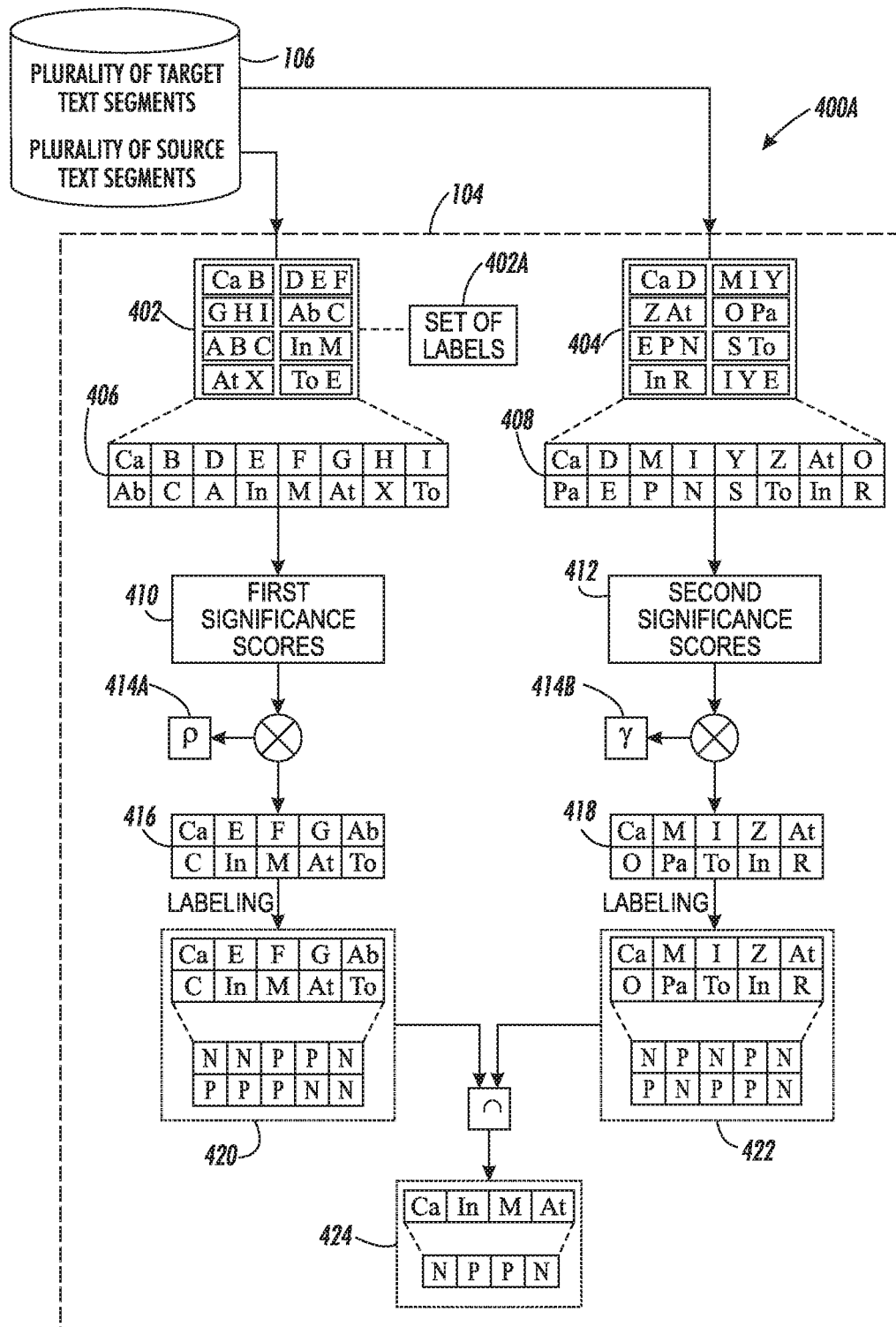
FIG. 4A is a block diagram that illustrates an exemplary scenario for identifying a set of common keywords for training a target domain classifier to label text segments, in accordance with at least one embodiment.

FIG. 4A is a block diagram that illustrates an exemplary scenario for identifying a set of common keywords for training a target domain classifier to label text segments, in accordance with at least one embodiment. FIG. 4A is described in conjunction with FIGS. 1-3B. With reference to FIG. 4A, there is shown an exemplary scenario 400A that illustrates the method of identifying the set of common keywords for training the target domain classifier to label text segments.

In an embodiment, the application server 104 may query the database server 106 to retrieve the plurality of source text segments 402 and the plurality of target text segments 404, based on the request received from the user-computing device 102. The plurality of source text segments 402 comprises source text segments, such as "Ca B" to "To E." Further, each of the plurality of source text segments 402 is associated with a label from the set of labels 402A. The plurality of target text segments 404 comprises target text segments, such as "Ca D" to "I Y E." The plurality of source text segments 402 comprises the plurality of source keywords 406, such as source keywords "Ca," "B," "D," . . . , and "To." The plurality of target text segments 404 comprises the plurality of target keywords 408, such as target keywords "Ca," "D," "M," . . . , and "R." The application server 104 may utilize one or more text processing techniques, such as optical character recognition technique, to identify the plurality of source keywords 406 and the plurality of target keywords 408 from the plurality of source text segments 402 and the plurality of target text segments 404, respectively.

Thereafter, the application server 104 may be configured to determine first significance scores 410 of the plurality of source keywords 406. The application server 104 may utilize one or more statistical techniques, such as chi-square hypothesis technique or term frequency-inverse document frequency technique known in the art, to determine the first significance scores 410. The application server 104 may further determine second significance scores 412 of the plurality of target keywords 408. The application server 104 may utilize one or more correlation techniques known in the art for determining the second significance scores 412. The application server 104 then utilizes the first significance scores 410 to identify the set of source keywords 416 from the plurality of source keywords 406. For identification, the application server 104 compares the first significance scores 410 of the plurality of source keywords 406 with "a" 414A (i.e., the first significance threshold value). Based on the comparison, the application server 104 identifies the source keywords in the plurality of source keywords 406, such as "Ca," "E," . . . , and "To," whose corresponding first significance score, in the first significance scores 410, exceeds "a" 414A (i.e., the first significance threshold value). The identified source keywords constitute the set of source keywords 416. The application server 104 further utilizes the second significance scores 412 to identify the set of target keywords 418 from the plurality of target keywords 408. For identification, the application server 104 compares the second significance scores 412 of the plurality of target keywords 408 with "p" 414B (i.e., the second significance threshold value). Based on the comparison, the application server 104 identifies the target keywords in the plurality of target keywords 408, such as "Ca," "M," . . . , and "R," whose corresponding second significance score, in the second significance scores 412, is less than "p" 414B (i.e., the second significance threshold value). The identified target keywords constitute the set of target keywords 418.

Further, the application server 104 may associate a label with each source keyword and target keyword in the set of source keywords 416 and the target keywords 418, respectively. For example, a source keyword "Ca" in the set of source keywords 416 is associated with a label "N" and a target keyword "M" in the set of target keywords 418 is associated with a label "P." The application server 104 further utilizes the labeled set of source keywords 420 and the labeled set of target keywords 422 to identify the set of common keywords 424. Each keyword in the set of common keywords 424 appears in both the labeled set of source keywords 420 and the labeled set of target keywords 422 with same label. For example, the keyword "Ca" appears in both the labeled set of source keywords 420 and the labeled set of target keywords 422 with label "N." Thus, the application server 104 identifies the keyword "Ca" to be an element of the set of common keywords 424. However, a keyword "To" that appears in the labeled set of source keywords 420 and the labeled set of target keywords 422 with different labels is not identified to be an element of the set of common keywords 424. The application server 104 stores the set of common keywords 424 in memory.

A person having ordinary skill in the art will understand that the abovementioned exemplary scenario is for illustrative purpose and should not be construed to limit the scope of the disclosure.

Figure 4B:
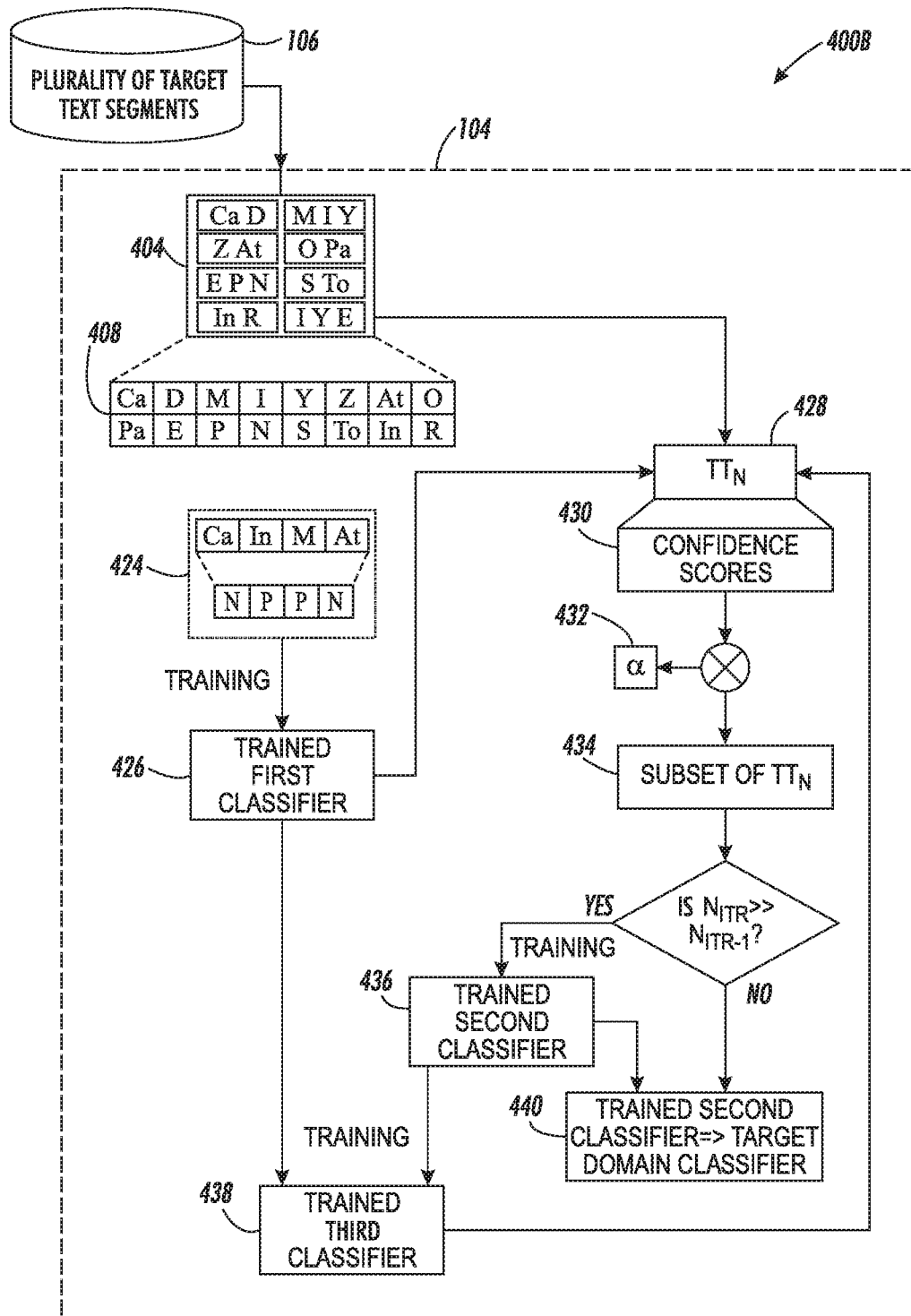
FIG. 4B is a block diagram that illustrates an exemplary scenario for training a target domain classifier to label text segments based on a set of common keywords, in accordance with at least one embodiment.

FIG. 4B is a block diagram that illustrates an exemplary scenario for training a target domain classifier to label text segments based on a set of common keywords, in accordance with at least one embodiment. FIG. 4B is described in conjunction with FIGS. 1-4A. With reference to FIG. 4B, there is shown an exemplary scenario 400B that illustrates the method for training the target domain classifier to label text segments based on the set of common keywords.

The application server 104 utilizes the set of common keywords 424 to train a first classifier 426. Further, the application server 104 utilizes the trained first classifier 426 to label the first set of target text segments "$TT_N$" (i.e., a set of target text segments 428 in first iteration) from the plurality of target text segments 404. The count of target text segments in the first set of target text segments is represented as subscript "N" in "$TT_N$." During labeling, the trained first classifier 426 associates confidence scores 430, such as the first confidence scores, with the target text segments in the first set of target text segments "$TT_N$" (i.e., the set of target text segments 428 in first iteration). Further, the application server 104 compares the first confidence score of each target text segment in the labeled first set of target text segments with "A" 432 (i.e., the confidence threshold value) to identify the subset of labeled first set of target text segments (i.e., the subset of labeled set of target text segments 434 in first iteration). The application server 104 identifies the labeled target text segments in the labeled first set of target text segments that have the first confidence score higher than "A" 432 (i.e., the confidence threshold value) to constitute the subset of labeled first set of target text segments (i.e., the subset of labeled set of target text segments 434 in the first iteration).

Thereafter, the application server 104 compares the count of text segments in the set of target text segments 428 (i.e., the first set of target text segments) in the current iteration with the count of text segments in the set of target text segments 428 in the previous iteration. As the first set of target text segments belongs to the first iteration, the count of text segments in the first set of target text segments exceeds the count (i.e., "0") of text segments in the set of target text segments 428 in the previous iteration.

Further, the application server 104 utilizes the subset of labeled first set of target text segments (i.e., the subset of labeled set of target text segments 434 in the first iteration) to train a second classifier 436. Further, the application server 104 utilizes the trained first classifier 426 and trained common second classifier 436 to train a third classifier 438. The third classifier 438 is trained based on a weighted sum of the trained first classifier 426 and trained second classifier 436. The weights of the trained first classifier 426 and trained second classifier 436 utilized to train the third classifier 438 are determined based on the accuracy parameter associated with each of the trained first classifier 426 and the trained second classifier 436.

After training, the application server 104 utilizes the trained third classifier 438 to label the second set of target text segments "$TT_N$" (i.e., another set of target text segments 434 in subsequent iterations) from the plurality of target text segments 404. The second set of target text segments appears next to the first set of target text segments in the plurality of target text segments 404. For example, if the first set of target text segments comprises target text segments, such as "Ca D" and "M I Y," the second set of target text segments may comprise target text segments, such as "Z At" and "O Pa." During labeling, the trained third classifier 438 associates confidence scores 430, such as the second confidence scores, with the target text segments in the second set of target text segments (i.e., the set of target text segments 434 in subsequent iterations). Further, the application server 104 compares the confidence scores 430, such as the second confidence scores, of each target text segment in the labeled second set of target text segments (i.e., the labeled set of target text segments 434 in subsequent iterations) with "A" 432 (i.e., the confidence threshold value) to identify the subset of labeled second set of target text segments (i.e., the subset of labeled set of target text segments 434 in subsequent iterations).

Thereafter, the application server 104 compares the count of text segments in the other set of target text segments 428 (i.e., the second set of target text segments) in the current iteration with the count of text segments in the set of target text segments 428 in the previous iteration. In an embodiment, the application server 104 re-trains the second classifier 436, when the count of text segments in the other set of target text segments 428 (i.e., the second set of target text segments) in the current iteration exceeds the count of text segments in the set of target text segments 428 in the previous iteration.

The application server 104 may terminate re-training of the second classifier 436, when the count of text segments in the other set of target text segments 428 (i.e., the second set of target text segments) in the current iteration is below the count of text segments in the set of target text segments 428 in the previous iteration. The final re-trained second classifier 436 may correspond to the target domain classifier 440.

A person having ordinary skill in the art will understand that the abovementioned exemplary scenario is for illustrative purpose and should not be construed to limit the scope of the disclosure.

The disclosed embodiments encompass numerous advantages. The disclosure provides a method and a system for training a target domain classifier to label text segments. The disclosed method and system utilizes a technique for cross-domain sentiment classification/labeling that is aware of features, such as keywords, with inconsistent polarity/sentiments across two domains, such as a source domain and a target domain. The disclosed method and system utilize labeled data, such as a plurality of source text segments, and unlabeled data, such a plurality of target text segments, to identify features, such as keywords, with consistent polarity/sentiments across the two domains. The disclosed method and system further utilize an iterative approach to train a target domain classifier that initially starts with common significant consistent polarity features, such a set of common keywords with the same label, across domains. In subsequent iterations, the target domain-specific discriminative features, such as a subset of labeled first target text segments and a subset of labeled second target text segments, are utilized to re-train the target domain classifier. The disclosed method and system reduce the overhead costs of manually classifying the plurality of target text segments associated with the target domain to generate a training set. The disclosed method and system may be utilized by any organization that deals with data analysis. For example, an organization may want to know the reviews of the public pertaining to its new product. The organization may utilize the disclosed method and system to automatically train a target domain classifier to classify/label the public reviews for the newly launched product.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS, 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for training a target domain classifier to label text segments have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method of data processing for training a target domain classifier to label text segments, the method comprising:
    identifying, by one or more processors in a computing device, a set of common keywords with same label from a set of source keywords and a set of target keywords, wherein each keyword in the set of source keywords and the set of target keywords is associated with a label;
    training, by the one or more processors in the computing device, a first classifier, based on the set of common keywords, to label a first set of target text segments from a plurality of target text segments, wherein each of the labeled first set of target text segments is associated with a first confidence score;
    training, by the one or more processors in the computing device, a second classifier based on at least a subset of the labeled first set of target text segments for which the first confidence score exceeds a confidence threshold value;
    training, by the one or more processors in the computing device, a third classifier, based on the trained first classifier and the trained second classifier, to label a second set of target text segments from the plurality of target text segments,
    wherein each of the labeled second set of target text segments is associated with a second confidence score,
    wherein a subset of the labeled second set of target text segments, for which the second confidence score exceeds the confidence threshold value, is utilized for re-training the second classifier; and
    determining, by the one or more processors in the computing device, labels of another plurality of target text segments based on the re-trained second classifier that corresponds to the target domain classifier.

2. The method of claim 1, further comprising receiving, by one or more transceivers in the computing device, from another computing device, a plurality of source text segments associated with a source domain and the plurality of target text segments associated with a target domain.

3. The method of claim 2, wherein the plurality of source text segments comprises a plurality of source keywords and the plurality of target text segments comprises a plurality of target keywords.

4. The method of claim 3, wherein the set of source keywords is identified from the plurality of source keywords, when a first significance score associated with a source keyword exceeds a first significance threshold value.

5. The method of claim 3, wherein the set of target keywords is identified from the plurality of target keywords, when a second significance score associated with a target keyword is less than a second significance threshold value.

6. The method of claim 2, wherein each of the plurality of source text segments is associated with a label and each of the plurality of target text segments is independent of a label.

7. The method of claim 1, wherein each keyword in the set of source keywords is labeled based on a first score, wherein the first score of a source keyword in the set of source keywords is determined based on one or more statistical techniques.

8. The method of claim 1, wherein each keyword in the set of target keywords is labeled based on a second score, wherein the second score for a target keyword in the set of target keywords is determined based on one or more similarity measures between the target keyword and a set of pre-defined keywords.

9. The method of claim 1, wherein the re-training of the second classifier is based on a count of target text segments in the second set of target text segments.

10. The method of claim 1, wherein the third classifier is a weighted combination of the trained first classifier and the trained second classifier, wherein the weights of the trained first classifier and the trained second classifier are determined based on an accuracy parameter associated with the trained first classifier and the trained second classifier.

11. A system of data processing for training a target domain classifier to label text segments, the system comprises:
    one or more processors in a computing device configured to:
    identify a set of common keywords with same label from a set of source keywords and a set of target keywords, wherein each keyword in the set of source keywords and the set of target keywords is associated with a label;
    train a first classifier, based on the set of common keywords, to label a first set of target text segments from a plurality of target text segments, wherein each of the labeled first set of target text segments is associated with a first confidence score;
    train a second classifier based on at least a subset of the labeled first set of target text segments for which the first confidence score exceeds a confidence threshold value;
    train a third classifier, based on the trained first classifier and the trained second classifier, to label a second set of target text segments from the plurality of target text segments,
    wherein each of the labeled second set of target text segments is associated with a second confidence score,
    wherein a subset of the labeled second set of target text segments, for which the second confidence score exceeds the confidence threshold value is utilized for re-training the second classifier; and
    determine labels of another plurality of target text segments based on the re-trained second classifier that corresponds to the target domain classifier.

12. The system of claim 11, wherein one or more transceivers in the computing device are configured to receive, from another computing device, a plurality of source text segments associated with a source domain and the plurality of target text segments associated with a target domain.

13. The system of claim 12, wherein the plurality of source text segments comprises a plurality of source keywords and the plurality of target text segments comprises a plurality of target keywords.

14. The system of claim 13, wherein the set of source keywords is identified from the plurality of source keywords, when a first significance score associated with a source keyword exceeds a first significance threshold value, wherein the set of target keywords is identified from the plurality of target keywords, when a second significance score associated with a target keyword is less than a second significance threshold value.

15. The system of claim 12, wherein each of the plurality of source text segments is associated with a label and each of the plurality of target text segments is independent of a label.

16. The system of claim 11, wherein each keyword in the set of source keywords is labeled based on a first score, wherein the first score of a source keyword in the set of source keywords is determined based on one or more statistical techniques.

17. The system of claim 11, wherein each keyword in the set of target keywords is labeled based on a second score, wherein the second score for a target keyword in the set of target keywords is determined based on one or more similarity measures between the target keyword and a set of pre-defined keywords.

18. The system of claim 11, wherein the re-training of the second classifier is based on a count of target text segments in the second set of target text segments.

19. The system of claim 11, wherein the third classifier is a weighted combination of the trained first classifier and the trained second classifier, wherein the weights of the trained first classifier and the trained second classifier are determined based on an accuracy parameter associated with the trained first classifier and the trained second classifier.

20. A computer program product for use with a computer, the computer program product comprising a non-transitory computer readable medium, wherein the non-transitory computer readable medium stores a computer program code of data processing for training a target domain classifier to label text segments, wherein the computer program code is executable by one or more processors in a computing device to:
    identify a set of common keywords with same label from a set of source keywords and a set of target keywords, wherein each keyword in the set of source keywords and the set of target keywords is associated with a label;
    train a first classifier, based on the set of common keywords, to label a first set of target text segments from a plurality of target text segments, wherein each of the labeled first set of target text segments is associated with a first confidence score;
    train a second classifier based on at least a subset of the labeled first set of target text segments for which the first confidence score exceeds a confidence threshold value;
    train a third classifier, based on the trained first classifier and the trained second classifier, to label a second set of target text segments from the plurality of target text segments,
    wherein each of the labeled second set of target text segments is associated with a second confidence score,
    wherein a subset of the labeled second set of target text segments, for which the second confidence score exceeds the confidence threshold value is utilized for re-training the second classifier; and
    determine labels of another plurality of target text segments based on the re-trained second classifier that corresponds to the target domain classifier.

* * * * *